United States Patent
Mauchle et al.

(10) Patent No.: US 9,745,148 B2
(45) Date of Patent: Aug. 29, 2017

(54) POWDER CONVEYOR AND ASSOCIATED OPERATING METHOD

(71) Applicant: GEMA SWITZERLAND GMBH, St. Gallen (CH)

(72) Inventors: Felix Mauchle, Abtwil (CH); Hanspeter Vieli, Goldach (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 0 days.

(21) Appl. No.: 14/782,316

(22) PCT Filed: Mar. 18, 2014

(86) PCT No.: PCT/EP2014/055442
§ 371 (c)(1),
(2) Date: Oct. 2, 2015

(87) PCT Pub. No.: WO2014/161717
PCT Pub. Date: Oct. 9, 2014

(65) Prior Publication Data
US 2016/0122138 A1    May 5, 2016

(30) Foreign Application Priority Data

Apr. 3, 2013  (DE) .................. 10 2013 205 895
Jun. 19, 2013 (DE) .................. 10 2013 211 536

(51) Int. Cl.
*B65G 51/18*  (2006.01)
*B65G 53/66*  (2006.01)
(Continued)

(52) U.S. Cl.
CPC ............ *B65G 53/66* (2013.01); *B05B 7/1404* (2013.01); *B05B 7/1459* (2013.01);
(Continued)

(58) Field of Classification Search
CPC .................... B65G 53/18; B65G 53/66
(Continued)

(56) References Cited

U.S. PATENT DOCUMENTS 4,662,799 A * 5/1987 Paul ................ B65G 53/12
                                                    406/14
4,900,199 A * 2/1990 Spaulding ......... B05B 7/1445
                                                    406/121
(Continued)

FOREIGN PATENT DOCUMENTS

CN          1886200 A    12/2006
CN       103687673 A     3/2014
(Continued)

OTHER PUBLICATIONS

International Preliminary Report on Patentability dated Oct. 6, 2015, for corresponding PCT Application No. PCT/EP2014/055442.

(Continued)

*Primary Examiner* — Joseph Dillon, Jr.
(74) *Attorney, Agent, or Firm* — Kinney & Lange, P.A.

(57) ABSTRACT

A powder conveyor has a pneumatically actuated dense phase powder pump and a pressure controller. The dense phase powder pump comprises at least one conveyor chamber having a powder inlet valve and a powder outlet valve. The pressure controller can be used to adjust and maintain a set pressure on the at least one conveyor chamber of the dense phase powder pump that is or can be previously defined and/or to adjust and maintain an actuation pressure on the powder inlet valve or the powder outlet valve that is or can be previously defined. The powder conveyor further comprises a gas flow detection device for detecting or determining a quantity of gas that is fed or removed per time unit when the set pressure is adjusted and maintained on the at least one conveyor chamber or a quantity of gas that is fed (Continued)

to the powder inlet valve or the powder outlet valve per time unit when the actuation pressure is adjusted and maintained. An evaluation device compares at least one detected or determined gas flow value with a corresponding set value and automatically generates an error and/or alarm signal when a deviation is detected.

19 Claims, 3 Drawing Sheets

(51) Int. Cl.
  *B05B 7/14*  (2006.01)
  *F04F 1/02*  (2006.01)
  *B65G 53/30*  (2006.01)
  *B65G 53/18*  (2006.01)
  *B65G 53/58*  (2006.01)
  *B65G 53/60*  (2006.01)

(52) U.S. Cl.
  CPC ............ *B05B 7/1463* (2013.01); *B65G 53/18* (2013.01); *B65G 53/30* (2013.01); *B65G 53/58* (2013.01); *B65G 53/60* (2013.01); *F04F 1/02* (2013.01)

(58) Field of Classification Search
  USPC .. 406/34, 50, 90, 127, 146, 14, 85, 91, 109; 222/394, 399
  See application file for complete search history.

(56) References Cited

U.S. PATENT DOCUMENTS

| | | | | | |
|---|---|---|---|---|---|
| 5,702,209 | A * | 12/1997 | Mauchle | ............... | B05B 12/085 406/12 |
| 6,283,680 | B1 * | 9/2001 | Vidal | ................... | B65G 53/32 222/207 |
| 6,447,215 | B1 * | 9/2002 | Wellmar | ............... | B65G 53/66 406/11 |
| 6,478,513 | B1 * | 11/2002 | Higuchi | .................. | F04B 15/02 406/109 |
| 6,623,215 | B2 * | 9/2003 | Dietrich | ............... | B05B 7/1459 406/197 |
| 6,719,500 | B2 * | 4/2004 | Pfeiffer | .................. | B65G 53/58 406/91 |
| 6,923,601 | B2 * | 8/2005 | Goth | ...................... | B65G 53/24 406/152 |
| 6,953,315 | B2 * | 10/2005 | Cartwright | ........... | G05D 7/0652 406/192 |
| 6,959,843 | B2 * | 11/2005 | Kondo | ............... | B22D 17/2007 222/195 |
| 7,144,213 | B2 * | 12/2006 | Cartwright | ........... | G05D 7/0652 406/192 |
| 7,150,585 | B2 * | 12/2006 | Kleineidam | .......... | B05B 7/1459 406/127 |
| 7,163,359 | B2 * | 1/2007 | Moser | .................... | B05B 7/1459 406/151 |
| 7,241,080 | B2 * | 7/2007 | Klobucar | ............. | B05B 7/1459 406/106 |
| 7,287,964 | B2 * | 10/2007 | Sanwald | ............... | B05B 7/1459 417/395 |
| 7,413,388 | B2 * | 8/2008 | Krebs | .................... | B65G 53/08 406/120 |
| 7,452,166 | B2 * | 11/2008 | von Keudell | ......... | B05B 7/1459 406/137 |
| 7,465,130 | B2 * | 12/2008 | Herre | .................... | B05B 7/1459 406/145 |
| 7,628,295 | B2 * | 12/2009 | Mondloch | ............... | E04F 21/12 222/394 |
| 7,731,456 | B2 * | 6/2010 | Fulkerson | ............. | B05B 7/1454 406/11 |
| 8,215,877 | B2 * | 7/2012 | Rieger | .................. | B05B 7/1459 406/127 |
| 8,231,310 | B2 * | 7/2012 | Sanwald | ............... | B05B 7/1459 406/127 |
| 8,491,227 | B2 * | 7/2013 | Fulkerson | ............. | B05B 7/1454 406/11 |
| 8,678,777 | B2 * | 3/2014 | Fulkerson | ............. | B05B 7/1459 406/90 |
| 8,790,048 | B2 * | 7/2014 | Furuyama | .............. | B65G 53/12 406/108 |
| 8,936,416 | B2 * | 1/2015 | Stutz, Jr. | ................. | B65G 53/40 222/400.5 |
| 8,951,022 | B2 * | 2/2015 | Mauchle | ............... | B05B 7/1459 406/50 |
| 9,085,065 | B2 * | 7/2015 | Reilley | ................... | B24C 9/006 |
| 2005/0095071 | A1 * | 5/2005 | Kleineidam | .......... | B05B 7/1459 406/73 |
| 2005/0229845 | A1 | 10/2005 | Mather et al. | | |
| 2006/0093442 | A1 | 5/2006 | Kleineidam et al. | | |
| 2006/0193704 | A1 * | 8/2006 | Simontacchi | ......... | B05B 7/1459 406/88 |
| 2008/0131214 | A1 * | 6/2008 | Krebs | .................... | B65G 53/08 406/14 |
| 2008/0277507 | A1 | 11/2008 | Fulkerson et al. | | |
| 2010/0034600 | A1 * | 2/2010 | Sanwald | ............... | B05B 7/1459 406/28 |
| 2010/0213281 | A1 * | 8/2010 | Mauchle | ............... | B05B 7/1459 239/373 |
| 2011/0162579 | A1 | 7/2011 | Mauchle et al. | | |
| 2011/0211919 | A1 * | 9/2011 | Rasner | .................. | B65G 53/24 406/14 |
| 2013/0011209 | A1 * | 1/2013 | Doig | ...................... | B65G 53/32 406/15 |
| 2015/0274443 | A1 * | 10/2015 | Reilley | ................... | B24C 9/006 406/121 |

FOREIGN PATENT DOCUMENTS

| | | |
|---|---|---|
| DE | 69529497 T2 | 10/2003 |
| DE | 10353968 A1 | 7/2005 |
| DE | 102004052949 A1 | 5/2006 |
| DE | 102005006522 B3 | 8/2006 |
| DE | 202006015697 U1 | 3/2007 |
| DE | 102007005313 A1 | 8/2008 |
| DE | 102007041551 A1 | 3/2009 |
| DE | 20071049219 A1 | 4/2009 |
| DE | 102007046738 A1 | 4/2009 |
| EP | 1297899 A1 | 4/2003 |
| WO | 9406516 A1 | 3/1994 |
| WO | 2008093202 A1 | 8/2008 |
| WO | 2008150790 A1 | 12/2008 |
| WO | 2013154702 A1 | 10/2013 |

OTHER PUBLICATIONS

The German Office Action mailed Mar. 25, 2014 for German Application No. 102013211536.9.
The International Search Report mailed May 19, 2014 for International Application No. PCT/EP2014/055442.
First Chinese Office Action, for Chinese Patent Application No. 201480019566.7, dated Feb. 4, 2017, 12 pages.

* cited by examiner

POWDER CONVEYOR AND ASSOCIATED OPERATING METHOD

BACKGROUND

The present invention relates to a powder conveyor, particularly for coating powder, as well as a method for operating such a powder conveyor.

Powder conveyors serve in conveying powder, coating powder in particular, from a first powder reservoir to for example a second powder reservoir disposed downstream of the powder conveyor or a powder spray-coating gun or similar device for spraying coating powder disposed downstream of the powder conveyor. To this end, a powder conveyor usually comprises at least one pump, particularly a dense phase powder pump, whereby the pump normally comprises at least one conveyor chamber having a powder inlet valve and a powder outlet valve.

German patent application No. 10 2013 205 895.0, for example, relates to a powder conveyor comprising a dense phase powder pump, wherein the dense phase powder pump can be controlled by a control unit such that during a powder-conveying operating mode of the dense phase powder pump, coating powder is conveyed from a first powder reservoir to a second powder reservoir disposed downstream of the first powder reservoir, respectively to a downstream powder spray-coating gun.

In the powder-conveying operating mode of the dense phase powder pump, a portion of powder is alternatingly suctioned into the conveyor chamber through the open powder inlet valve while the powder outlet valve is closed and the portion of powder previously suctioned into the conveyor chamber through the open powder inlet valve is dispensed by the introduction of conveying compressed gas into the conveyor chamber while the powder inlet valve is closed.

In a flushing operating mode of the dense phase powder pump, however, either the powder inlet valve or the powder outlet valve is open while the other of the two valves is closed and whereby at the same time or after a delay, flushing compressed gas is introduced into the conveyor chamber.

On the other hand, the EP 1 551 558 A1 published document, for example, relates to a powder conveyor comprising a dense phase powder pump having a first conveyor chamber and a second powder conveyor chamber arranged parallel to the first conveyor chamber. The two conveyor chambers of this known prior art dense phase powder pump are each limited both on the intake side as well as the discharge side by a (mechanically operated) pinch valve arrangement.

The present invention is to address the task of further developing a powder conveyor of the type cited at the outset to the effect of being able to easily yet effectively detect a potential malfunctioning of the dense phase powder pump automatically. A corresponding method for operating such a powder conveyor is moreover to be specified.

This task is solved with respect to the powder conveyor as set forth in the specification and claims.

SUMMARY

Accordingly, the invention specifies a powder conveyor exhibiting at least one dense phase powder pump. The at least one dense phase powder pump comprises at least one conveyor chamber having a powder inlet valve and a powder outlet valve, wherein the powder inlet valve and the powder outlet valve are respectively designed as pneumatically actuatable pinch valves which close upon application of an actuation pressure.

A control unit of the powder conveyor serves to control the correspondingly actuatable components of the powder conveyor and does so such that the dense phase powder pump is in particular operated in either a powder-conveying operating mode or a flushing operating mode. A pressure regulator is allocated to the control unit which provides the actuation pressure required to operate the dense phase powder pump. Specifically, the pressure regulator serves to adjust and maintain a predefined or definable set pressure on the at least one conveyor chamber of the dense phase powder pump and/or to adjust and maintain a predefined or definable actuation pressure on the powder inlet valve and/or powder outlet valve.

To this end, the pressure regulator is in particular designed to provide a predefined or definable negative pressure on the at least one outlet of the pressure regulator during a powder suction phase in the powder-conveying operating mode of the dense phase powder pump and a predefined or definable excess pressure during a powder discharge phase of the dense phase powder pump. The pressure regulator is preferably further designed to provide a predefined or definable excess pressure on the at least one outlet of the pressure regulator in a flushing operating mode of the dense phase powder pump which is in particular higher than the excess pressure the pressure regulator provides during a powder discharge phase of the dense phase powder pump.

On the other hand, the pressure regulator preferably serves to provide the required and predefined or definable actuation pressure for the actuation of the powder inlet valve configured as a pinch valve, respectively the actuation pressure required for the actuation of the powder outlet valve configured as a pinch valve.

In order to be able to preferably automatically monitor the proper operation of the dense phase powder pump either in a powder-conveying operating mode or in a flushing operating mode, the invention provides for a gas flow detection device designed to detect the volume of gas fed to or discharged from the at least one conveyor chamber per unit of time when adjusting and maintaining the predefined or definable set pressure. Alternatively or additionally thereto, the gas flow detection device is designed to detect the volume of gas fed to the powder inlet valve and/or powder outlet valve per unit of time when adjusting and maintaining the predefined or definable actuation pressure.

To be generally understood by the term "gas flow detection device" as used herein is a device able to directly or indirectly detect a volumetric gas flow or infer a volumetric gas flow in some other way. The term "volumetric gas flow" hereby indicates the mass flow or volumetric flow of a gas supplied to a pneumatically actuatable component of the dense phase powder pump during the operation of the dense phase powder pump or discharged from a pneumatically actuatable component of the dense phase powder pump. This for example relates to the mass or volume of a conveying compressed gas which is fed to the conveyor chamber per unit of time during the powder discharge phase of the dense phase powder pump in powder-conveying operating mode.

If for example a filter element allocated to the conveyor chamber (at least partially) clogs due to age during the operation of the dense phase powder pump, the volume of gas supplied to the conveyor chamber in the powder discharge phase decreases in comparison to an unclogged filter element state.

Cited as a further example is the amount (mass or volume) of actuating compressed gas supplied to a respective valve per unit of time during actuation of the powder inlet/outlet valve. In a case of the powder inlet/outlet valve leaking, due for example to age, the volume of gas supplied for the actuation of the powder inlet/outlet valve increases.

This shows that the volumetric gas flow can be used as a measure of the functional capability of the pneumatically actuatable component of the dense phase powder pump. In conjunction hereto, it is of no consequence whether a quantitative value of the gas flow is detected by the gas flow detection device or in some other manner, for example by means of a flow sensor or other such mechanism. Such a flow sensor device can for example be designed to detect a volumetric or mass flow rate in a compressed gas line fluidly coupled in an outlet of the pressure regulator to the conveyor chamber. Alternatively or additionally hereto, the flow sensor device can be designed to detect a volumetric or mass flow rate in a compressed gas line fluidly coupled in an outlet of the pressure regulator to the powder inlet/outlet valve.

For example, as will be explained in greater detail below, a device can be provided for detecting and/or determining a qualitative value of the volumetric gas flow which detects and/or determines the amount of gas fed to or discharged from the at least one conveyor chamber per unit of time in the adjusting and maintaining of the set pressure and doing so based on a flow cross section of a throttle device set by the pressure regulator and/or detects and/or determines the value of the volume of gas supplied to the powder inlet valve and/or the powder outlet valve per unit of time in the adjusting and maintaining of the actuation pressure based on a flow cross section of a throttle device set by the pressure regulator.

According to the invention, the powder conveyor further comprises an evaluation device designed to compare at least one detected volumetric gas flow value to a corresponding set value, wherein the evaluation device is further designed to automatically issue an error and/or warning signal upon the at least one detected volumetric gas flow value deviating from the respective set value depending on the magnitude of the deviation.

The present invention is based inter alia on the realization that when a pneumatically actuatable dense phase powder pump is used, the functioning of the dense phase powder pump, and particularly the components of the dense phase powder pump subject to increased wear during the operation of said dense phase powder pump, can be monitored by using the amount of gas supplied per unit of time to the components to be pneumatically actuated during the dense phase powder pump's operation. If, for example, during a powder discharge phase in the powder-conveying operating mode, the gas flow detection device detects that the conveyor chamber of the dense phase powder pump only needs to be supplied a relatively small volume of conveying compressed air per unit of time so as to set and maintain the predefined or definable excess pressure (set pressure) in the conveyor chamber, the evaluation device draws the conclusion that a filter element associated with the conveyor chamber is possibly clogged or at least partially clogged and to be replaced.

In pneumatically actuated dense phase powder pumps, particularly the powder inlet and powder outlet valves configured as pinch valves are subject to a high degree of wear since they need to be in relatively frequent use during the operation of the dense phase powder pump. In accordance with the inventive solution, the gas flow detection device can detect the amount of actuating compressed gas supplied per unit of time to the pinch valve so as to be able to set and maintain the predefined or definable actuation pressure on the pinch valve. When it appears that the volume of actuating compressed gas supplied to the pinch valve per unit of time is increasing over time, the evaluation device can draw the conclusion that a leak has developed, which would have the consequence of the pinch valve no longer working properly such that when the valve is actuated, a higher amount of actuating compressed gas is supplied to the valve per unit of time than would be the case when the pinch valve is functioning properly and actuating compressed gas is not able to escape due to leakage.

On the other hand, the inventive solution can also determine whether the suction action of the dense phase powder pump is properly working during the powder suction phase. Since the conveyor chamber of the dense phase powder pump is under a predefined or definable negative pressure during a powder suction phase, so that a portion of powder can be suctioned into the conveyor chamber through the open powder inlet valve by way of the negative pressure, the amount of gas to be drawn per unit of time from the conveyor chamber can be used to determine whether the powder suction phase is following the intended sequence of events. If the required volume of gas to be drawn per unit of time in the powder suction phase so as to set and maintain the predefined or definable negative pressure in the conveyor chamber is above or below a respective set value, it can be concluded that the suctioning of powder during the powder suction phase is not functioning properly.

According to one aspect of the invention, a sensor device is further provided to detect at least one set pressure value on the powder inlet valve during the actuation of the powder inlet valve and/or to detect at least one set pressure value on the powder outlet valve during the actuation of the powder outlet valve and/or to detect at least one set negative pressure value in the at least one conveyor chamber during a powder suction phase of the dense phase powder pump and/or to detect at least one set negative pressure value in the at least one conveyor chamber during a powder discharge phase or flushing mode of the dense phase powder pump. To this end, the sensor device can for example comprise at least one pressure sensor arranged at the outlet of the pressure regulator which is fluidly connected or connectable to the powder inlet valve, the powder outlet valve and/or the conveyor chamber. On the other hand, however, it is also conceivable for one pressure sensor to be allocated to the powder inlet valve and/or the powder outlet valve and a further pressure sensor to the conveyor chamber.

The sensor device is functionally part of the pressure control since when the dense phase powder pump is in operation, the sensor device detects and controls whether the predefined pressure values are actually set for the correspondingly pneumatically actuated components of the dense phase powder pump or whether the pressure regulator needs to intervene in respective regulatory manner. The provision of the sensor device in particular ensures that the respective predefined or definable set values are set for the at least one conveyor chamber of the dense phase powder pump during the powder-conveying and flushing mode of operation. For example, a predefined excess pressure of 1 to 3 bar is applied in the conveyor chamber during a powder discharge phase in powder-conveying mode. In the flushing mode of operation, however, the pressure set in the conveyor chamber is to be higher, e.g. 2 to 5 bar.

The sensor device preferably further ensures that upon the actuating of the powder inlet and powder outlet valves configured as pinch valves, a predefined actuation pressure of for example 1 to 6 bar (depending on the dense phase powder pump's mode of operation) is set on same.

In conjunction hereto, it is of advantage when the sensor device cooperates with the pressure regulator such that the pressure values detected by the sensor device are fed to the pressure regulator as actual values in a feedback coupling, whereby the pressure regulator adjusts the pressures to be set and maintained for the pneumatically actuatable components of the dense phase powder pump during its operation to the respectively predefined or definable value.

One preferential realization of the inventive solution provides for the pressure regulator to comprise an inlet and at least one outlet, wherein the inlet of the pressure regulator is fluidly connected or connectable to a compressed air source providing a predefined or definable constant supply pressure. The compressed air source is for example designed as an inlet pressure regulator which adjusts the inlet pressure applied on a supply connection to an internal constant supply pressure of for example 6 to 8 bar.

Regardless of the actual implementation of the compressed air source, it is of advantage for same to be a mechanism able to provide a predefined or definable constant supply pressure.

According to one aspect of the invention, it is provided in conjunction hereto for the pressure regulator to comprise at least one throttle device. The at least one throttle device is designed to set a discharge cross section in localized manner so as to provide the predefined or definable set pressure to be applied on the at least one conveyor chamber and/or the predefined or definable actuation pressure to be applied on the powder inlet valve or powder outlet valve at the at least one pressure regulator outlet.

For example, it is conceivable for the at least one throttle device of the pressure regulator to be designed to be able to locally adjust a flow cross section of a compressed gas line fluidly connected or connectable to the conveyor chamber of the dense phase powder pump so as to thereby be able to set a predefinable (defined) pressure value of a conveying compressed gas fed to the conveyor chamber during the dense phase powder pump's operation. It is hereby conceivable for the throttle device to comprise at least one butterfly valve, particularly in the form of a control valve, designed to set a pressure value for the conveying compressed gas fed to the conveyor chamber during the powder-conveying operating mode.

Alternatively or additionally hereto, the at least one butterfly valve is preferably designed so as to set a pressure value for the flushing compressed gas introduced into the conveyor chamber during the flushing mode of operation to a predefined or definable (defined) value.

In one particularly simple to realize yet effective embodiment, the butterfly valve comprises a stationary valve part, particularly in the form of a valve seat, and a valve part which is movable and thereby adjustable relative thereto for changing the opening width of a throttling channel of the at least one butterfly valve, whereby the geometrical form of the adjustable valve part is selected such that the butterfly valve exhibits a flow characteristic having at least two substantially linear regions. The at least two substantially linear regions of the flow characteristic thereby exhibit different predefined gradients.

In conjunction hereto, it is conceivable for a control unit provided for the powder conveyor to control the butterfly valve such that the compressed volumetric gas flow through said butterfly valve is within a first substantially linear region of the flow characteristic in the powder-conveying operating mode and control the butterfly valve such that the compressed volumetric gas flow through said butterfly valve is within a second substantially linear region of the flow characteristic in the flushing operating mode.

Regardless of the actual configuration of the throttle device part of the pressure regulator, it is preferably to be designed to adjust the flow cross section of the at least one throttle device as a function of at least one pressure valve set during the operation of the dense phase powder pump and detected for example by means of the above-cited sensor device such that the at least one detected pressure valve (actual value) corresponds to the at least one set valve applied on the conveyor chamber or the actuation pressure applied on the powder inlet/outlet valve.

A preferential further development of the latter embodiment provides for configuring the gas flow detection device so as to detect the value of the volume of gas fed to or discharged from the at least one conveyor chamber per unit of time when adjusting and maintaining the set pressure and/or the value of the volume of gas supplied to the powder inlet valve or powder outlet value per unit of time when adjusting and maintaining the actuation pressure based on a flow cross section of the at least one throttle device set by the pressure regulator. In other words, a conclusion is drawn based on the actuating variable of the pressure regulator, which in the embodiment described here corresponds to the flow cross section of the at least one throttle device, as to a quantitative or qualitative value for the volume of gas flowing through the throttle device and supplied to the at least one conveyor chamber or the powder inlet or outlet valve per unit of time. This relates to the volumetric flow of gas required to set and maintain the predefined (defined) pressure value (set value) on the at least one conveyor chamber or on the powder inlet/powder outlet valve.

The evaluation device is for example designed to automatically deduce a leak in the powder inlet valve or powder outlet valve or a malfunction of the powder inlet valve or powder outlet valve and issue a corresponding error and/or warning signal when it is detected by the gas flow detection device or in some other way that the amount of actuating compressed gas supplied per unit of time to the powder inlet/outlet valve as required for setting the predefined or definable actuation pressure (=set pressure) on the powder inlet/outlet valve is higher than a predefined or definable volumetric gas flow plus any given tolerance (=reference value) there might be.

The predefined or definable volumetric gas flow is the set value used by the evaluation device in making the comparison. This set value can be recorded for example when the powder conveyor is first put into service and stored accordingly in the evaluation device. It is however also conceivable to regularly re-generate the set value anew, for example whenever the powder conveyor is in a non-operating state.

Additionally or alternatively to the latter embodiment of the evaluation device, a further aspect of the invention provides for the evaluation device to be designed to automatically deduce blockage, aging or malfunctioning of a filter element or filter allocated to the conveyor chamber and issue a corresponding error and/or warning signal when the gas flow detection device detects that the amount of compressed gas supplied to the conveyor chamber per unit of time in at least one powder discharge phase or in the flushing mode of the dense phase powder pump as required to set and maintain the predefined or definable set pressure in the conveyor chamber deviates from a predefined or definable gas flow plus any applicable tolerance.

For example, the evaluation device can be designed to automatically deduce the clogging of a filter element or filter allocated to the conveyor chamber and issue an appropriate error and/or warning signal when during at least one powder discharge phase of the dense phase powder pump, the gas flow detection device detects that the amount of compressed gas supplied to the conveyor chamber per unit of time as required to set and maintain a predefined or definable negative pressure in the conveyor chamber deviates from a predefined or definable gas flow plus any applicable tolerance.

In accordance with preferential realizations of the inventive powder conveyor, it is provided for the powder inlet valve and/or the powder outlet valve to be designed as pinch valve(s), and of the type in which a flexible tube separates a valve channel in the tube interior from a pressure chamber allocated to the pinch valve on the tube exterior, wherein the actuation pressure of the actuating compressed gas introduced into the pressure chamber can squeeze the tube, thereby closing the valve channel. As noted above, the pressure control of the control unit provides the actuation pressure needed to activate the powder inlet valve or respectively powder outlet valve accordingly designed as a pinch valve.

It is conceivable in this case for the previously cited sensor device to comprise at least one pressure sensor allocated to the powder inlet valve, whereby this pressure sensor allocated to the powder inlet valve serves in detecting an actually set pressure value (actual value) in the pressure chamber of the powder inlet valve when the powder inlet valve is actuated. Additionally or alternatively hereto, it is advantageous for the sensor device to comprise at least one pressure sensor allocated to the powder outlet valve which serves to detect an actually set pressure value (actual value) in the pressure chamber of the powder outlet valve when the powder outlet valve is actuated.

The pressure sensor allocated to the powder inlet valve as well as the pressure sensor allocated to the powder outlet valve can in each case be arranged in the pressure chamber of the respective valve designed as a pinch valve. However, arranging the pressure sensor in a compressed air line leading into the pressure chamber of the respective pinch valve, via which the actuating compressed gas is supplied to the pinch valve pressure chamber, is of course also conceivable.

With respect to the dense phase powder pump of the powder conveyor, preferential realizations of the inventive solution provide for the conveyor chamber of the dense phase powder pump to have a chamber wall formed by a filter along at least a part of its length between a conveyor chamber powder inlet and powder outlet, whereby the filter surrounds the conveyor chamber and separates the conveyor chamber from a partition wall surrounding the filter and formed between the filter and a conveyor chamber housing, wherein the filter is permeable to gas but not to coating powder.

It is advantageous with this realization for the previously cited sensor device to comprise at least one pressure sensor allocated to the conveyor chamber in order for said pressure sensor allocated to the conveyor chamber to detect an actually set pressure value of a negative pressure applied to the conveyor chamber in the intermediate chamber formed between the filter and the conveyor chamber housing during a powder discharge phase of the dense phase powder pump.

According to one aspect of the present invention, the gas flow detection device is designed to at least intermittently detect one of the following chronological sequences during the operation of the dense phase powder pump and compare same to a correspondingly predefined chronological sequence:

- the chronological sequence of an amount of actuating compressed gas fed to the powder inlet valve per unit of time upon the powder inlet valve being actuated;
- the chronological sequence of an amount of actuating compressed gas fed to the powder outlet valve per unit of time upon the powder outlet valve (8) being actuated;
- the chronological sequence of an amount of gas discharged from the at least one conveyor chamber per unit of time during powder suction phases of the dense phase powder pump; and
- the chronological sequence of an amount of compressed conveying gas fed to the at least one conveyor chamber per unit of time during powder discharge phases of the dense phase powder pump.

Particularly advantageous to this aspect is for the evaluation device to be designed to automatically issue an error and/or warning signal upon detecting that at least one chronological process deviates from the respectively predefined chronological process, preferably as a function of the magnitude and/or chronological gradient to the difference between the predefined chronological process and the detected chronological process.

The invention does not relate solely to a powder conveyor but also to a method for operating a powder conveyor, wherein the method comprises the following method steps:

- adjusting and maintaining a predefined or definable negative pressure in a conveyor chamber of a dense phase powder pump during a powder suction phase of the dense phase powder pump; and/or
- adjusting and maintaining a predefined or definable excess pressure in a conveyor chamber of a dense phase powder pump during a powder discharge phase of the dense phase powder pump; and/or
- adjusting and maintaining a predefined or definable excess pressure in a conveyor chamber of a dense phase powder pump during a flushing mode of the dense phase powder pump operation; and/or
- adjusting and maintaining a predefined or definable actuation pressure in a powder inlet valve of the dense phase powder pump designed as a pneumatically actuatable pinch valve and/or in a powder outlet valve of the dense phase powder pump designed as a pneumatically actuatable pinch valve;
- detecting a volumetric gas flow suctioned out of the conveyor chamber during the powder suction phase as required to enable the setting and maintaining of the predefined or definable negative pressure in the conveyor chamber; and/or
- detecting a volumetric gas flow supplied to the conveyor chamber during the powder discharge phase as required to enable the setting and maintaining of the predefined or definable excess pressure in the conveyor chamber; and/or
- detecting a volumetric gas flow supplied to the conveyor chamber in the flushing operating mode of the dense phase powder pump as required to enable the setting and maintaining of the predefined or definable excess pressure in the conveyor chamber; and/or
- detecting a volumetric amount of actuating gas supplied to the powder inlet valve and/or powder outlet valve upon the respective valve being actuated as required to enable the setting and maintaining of the predefined or definable actuation pressure in the powder inlet valve and/or powder outlet valve;

comparing the at least one detected gas flow volume to a respective set value; and issuing an error and/or warning signal when the at least one detected gas flow volume deviates from the respective set value including any applicable range of tolerance there might be.

BRIEF DESCRIPTION OF THE DRAWINGS

The following will reference the accompanying drawings in describing the invention in greater detail by way of example embodiments.

Shown are.

DETAILED DESCRIPTION

Figure 1:
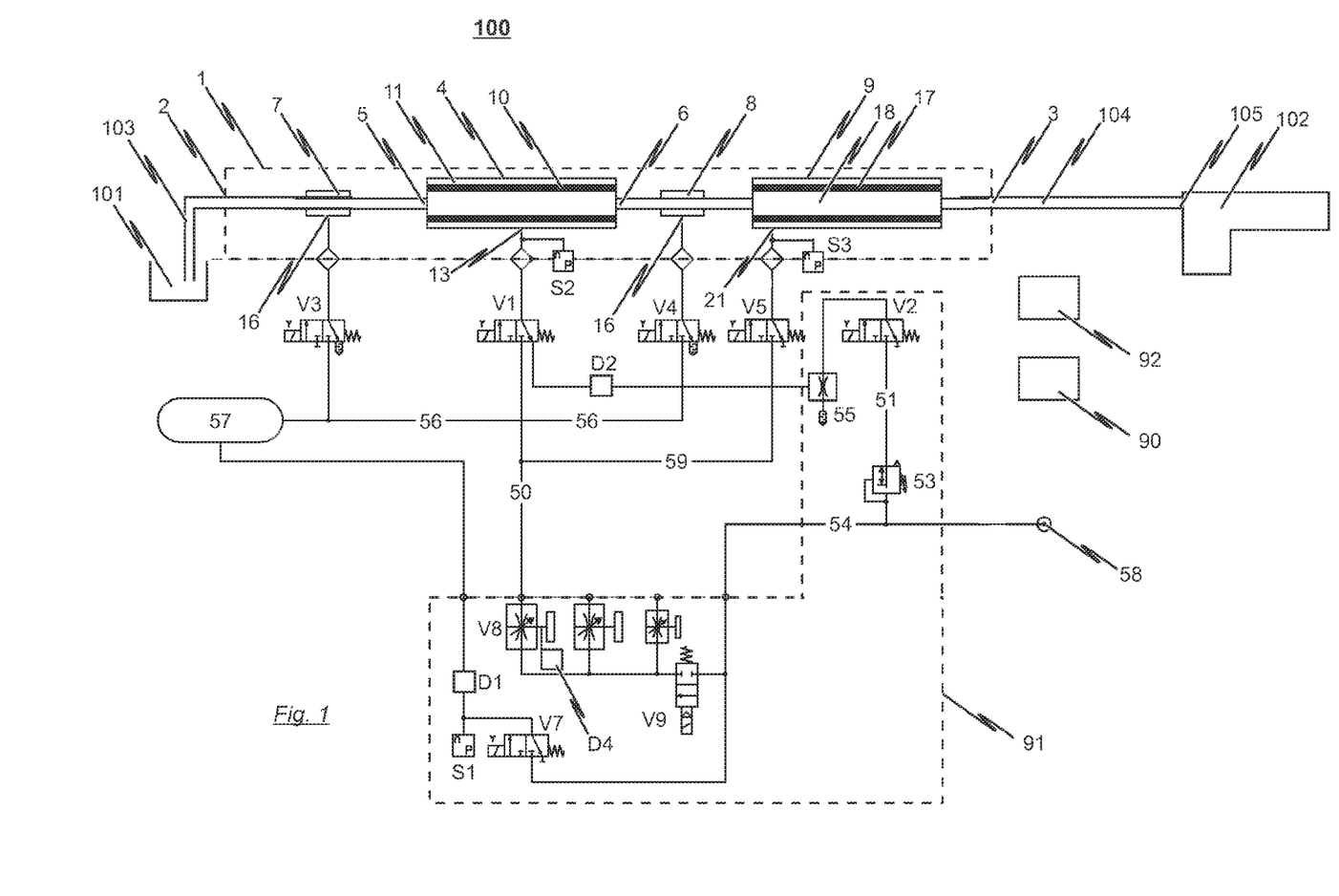
FIG. 1 a schematic depiction of a first example embodiment of a powder conveyor according to the present invention.

The following will reference the depiction provided in FIG. 1 in describing a first example embodiment of the inventive powder conveyor 100. The powder conveyor 100 in particular serves in the conveying of coating powder from a first powder reservoir 101 to a powder spray-coating gun 102 disposed downstream of the powder conveyor 100. Another device for spraying coating powder onto an object to be coated can also be used in place of the powder spray-coating gun 102 as can also a second powder reservoir.

The powder conveyor 100 according to the embodiment depicted as an example in FIG. 1 comprises at least one (in the FIG. 1 drawing, exactly one) dense phase powder pump 1. The powder inlet 2 of the dense phase powder pump 1 is fluidly connected or connectable to the first powder reservoir 101 via a powder line 103, particularly by means of an intake tube or the like. A powder outlet 3 connected or connectable to a coating powder inlet 105 of the powder spray-coating gun 102 via a powder line 104, particularly by means of a powder tube, is provided at the opposite end region of the dense phase powder pump 1.

Although it is not explicitly depicted in FIG. 1, both the powder inlet 2 as well as the powder outlet 3 of the dense phase powder pump 1 are respectively designed in the example embodiment of the powder conveyor 100 as hose connectors able to be attached to the corresponding powder line 103/104 and fixed with a hose clip. Of course other embodiments are also conceivable for the powder inlet 2 and/or powder outlet 3 of the dense phase powder pump 1.

The dense phase powder pump 1 employed in the example embodiment of the powder conveyor 100 depicted in FIG. 1 is characterized inter alia by being designed as a single-chamber dense phase powder pump, wherein only one powder conveyor chamber 4 is provided for the conveying of coating powder from the first powder reservoir 101 to the powder spray-coating gun 102, or to another device for the spray coating of objects respectively, or to a further powder reservoir. The invention is however not limited to powder conveyors employing single-chamber dense phase powder pumps. The invention in fact also encompasses powder conveyors employing multi-chamber dense phase powder pumps.

The dense phase powder pump 1 employed in the powder conveyor 100 depicted schematically in FIG. 1 is however designed therein as a single-chamber dense phase powder pump, wherein just one powder conveyor chamber 4 is provided to convey coating powder from the first powder reservoir 1 to the powder spray-coating gun 102 or to another respective device for spray coating objects or to another powder reservoir. Said powder conveyor chamber 4 comprises a powder inlet 5 on a first end region pointing in the direction of the powder inlet 2 of the dense phase powder pump 1. The powder conveyor chamber 4 further comprises a powder outlet 6 pointing in the direction of the powder outlet 3 of the dense phase powder pump. A powder inlet valve 7 is provided directly adjacent the powder inlet 5 of the powder conveyor chamber 4 and provided in such a manner that the powder inlet valve 7 is positioned between the powder inlet 5 of the powder conveyor chamber 4 and the powder inlet 2 of the dense phase powder pump 1. A powder outlet valve 8 is arranged in like manner directly adjacent the powder outlet 6 of the powder conveyor chamber 4.

When a single-chamber dense phase powder pump is used in the powder conveyor 100, it is advantageous for the powder outlet valve 8 not to be arranged directly between the powder outlet 6 of the powder conveyor chamber 4 and the powder outlet 3 of the dense phase powder pump 1 at the powder outlet region of the dense phase powder pump 1. Of advantage instead in these embodiments is for an auxiliary compressed air inlet device 9 to be arranged between the powder outlet valve 8 and the powder outlet 3 of the dense phase powder pump 1. As will be described in greater detail below, this auxiliary compressed air inlet device 9 serves in feeding auxiliary conveying compressed air into the powder path between the powder outlet valve 8 and the powder outlet 3 of the dense phase powder pump 1 when needed.

It is to be pointed out here that it is not essential to the invention for the auxiliary compressed air inlet device 9 to be arranged between the powder outlet valve 8 and the powder outlet 3 of the single-chamber dense phase powder pump 1. The effect able to be achieved with the auxiliary compressed air inlet device 9 can also be realized, as will be described in greater detail below, when an auxiliary compressed air inlet device 9 is arranged behind the powder outlet 3 of the dense phase powder pump 1.

Although it is not depicted in the drawings, in advantageous realizations of the inventive powder conveyor 100, a further valve, particularly a pinch valve, is provided between the auxiliary compressed air inlet device 9 of the dense phase powder pump 1 designed as a single-chamber system and the powder outlet 3 of the dense phase powder pump 1, which then assumes the function of the powder outlet valve by virtue of being arranged directly at the powder outlet 3 of the dense phase powder pump 1.

As can in particular be seen from the depiction of FIG. 1, the powder inlet 3 of the dense phase powder pump 1, the powder inlet valve 7, the powder inlet 5 of the powder conveyor chamber 4, the powder conveyor chamber 4, the powder outlet 6 of the powder conveyor chamber 4, auxiliary compressed air inlet device 9 as well as the powder outlet 3 of the dense phase powder pump 1 all lie along a common longitudinal axis. In other words, the powder inlet 2 of the dense phase powder pump 1 is provided at the opposite end from the powder outlet 3 of the dense phase powder pump 1.

It is to be pointed out here that the invention is not limited to powder conveyors employing dense phase powder pumps having the powder inlet 2 and powder outlet 3 arranged at opposite end regions. In fact, the invention is also applicable to dense phase powder pumps having the powder inlet and powder outlet on one and the same end region of the dense phase powder pump.

The following will describe in greater detail the configuration and mode of operation of the powder conveyor chamber 4 of the example embodiment of the dense phase powder pump 1 employed in the inventive powder conveyor 100 as depicted schematically in FIG. 1.

As can in particular be seen from the schematic representation of FIG. 1, the powder conveyor chamber 4 is formed by the cylindrical wall of a tube-like filter 10 between its powder inlet 5 and its powder outlet 6. This tubular filter 10 is permeable to air but not to coating powder and can for example be made of sintered material. The filter 10 configured as a filter tube is surrounded by a intermediate chamber 11 which is limited on its exterior by a housing of the powder conveyor chamber 4.

An air exchange vent 13 fluidly coupled to a control valve V1 (here: solenoid valve) leads through the housing. The powder conveyor chamber 4 is alternatingly supplied with conveying compressed air from a compressed air line 50 or subjected to a vacuum or negative pressure of a vacuum source by means of the control valve V1.

In the example embodiment of the inventive powder conveyor 100 depicted schematically in FIG. 1, the vacuum source comprises an injector 55 which is supplied with injector compressed air from a compressed air line 51, or a compressed air supply 58 respectively, for example by means of a pressure regulator 53 and a further control valve V2 (here: solenoid valve).

In the depicted embodiment, the compressed air supply 58 is configured as an inlet pressure regulator which sets an inlet pressure applied on a (not shown) supply connection at a constant internal supply pressure of e.g. 6 to 8 bar.

Regardless of the specific design to the compressed air supply 58, it is advantageous for same to be a mechanism able to provide a predefined or definable constant supply pressure.

In order for coating powder to be suctioned out of the first powder reservoir 101 into the powder conveyor chamber 4 via the powder inlet 2 of the dense phase powder pump 1 during a suction phase of the dense phase powder pump 1 when in powder-conveying operating mode, the powder outlet valve 8 disposed at the powder outlet 6 of the powder conveyor chamber 4 is closed and the powder inlet valve 7 disposed between the powder inlet 2 of the dense phase powder pump 1 and the powder inlet 5 of the powder conveyor chamber 4 is open. Simultaneous to the powder outlet valve 8 and the powder inlet valve 7 being actuated, or immediately thereafter, the powder conveyor chamber 4 is fluidly coupled to the vacuum source by means of the control valve V1 and the thereby connected air exchange vent 13 so that the powder conveyor chamber 4 is under negative pressure and coating powder can be suctioned out of the first powder reservoir 101.

After coating powder has been suctioned into the powder conveyor chamber 4, the suction phase changes to the coating powder discharge phase out of the conveyor chamber 4. To this end, powder inlet valve 7 is closed and powder inlet valve 8 opened while the control valve V1 establishes a fluidic connection between the air exchange vent 13 and the compressed air line 50 so that the portion of coating powder previously suctioned into the powder conveyor chamber is expelled through the open powder outlet valve during the suction phase by means of the conveying compressed air supplied via the air exchange vent 13. As can be noted from the pneumatic diagram of FIG. 1, the compressed air line 50 is fluidly coupled to the compressed air supply 58 in this embodiment by means of a pressure regulator 91.

The operating phase of suctioning coating powder via the powder inlet 2 of the dense phase powder pump 1 and the open powder inlet valve 7 then follows again thereafter. This change of operating phases is continually repeated in the powder-conveying operating mode of the dense phase powder pump.

To be understood herein by the term "pump cycle" is a cycle consisting of one suction phase and one discharge phase.

In the powder conveyor 100 according to the invention, the valves arranged at the inlet and outlet side of the powder conveyor chamber 4 (powder inlet valve 7, powder outlet valve 8) are each configured as pinch valves. In the embodiment depicted schematically in FIG. 1, the powder inlet and powder outlet valves 7, 8 configured as pinch valves each comprise a flexible, elastic tube serving as the valve channel. Actuating compressed air in a pressure chamber surrounding the flexible, elastic tube can squeeze the flexible, elastic tube in order to close the respective valve (powder inlet valve 7, powder outlet valve 8).

An air exchange vent 16 attached to a corresponding control valve V3, V4 (here: solenoid valve) is respectively provided in each pressure chamber for this purpose. The control valves V3, V4 thereby serve in alternatingly subjecting the pressure chambers of the two powder inlet/powder outlet valves 7, 8 respectively configured as pinch valves to excess pressure from a compressed air line 56.

As shown schematically in FIG. 1, the compressed air line 56 can be connected to a pressure storage unit 57. In the embodiment according to FIG. 1, this pressure storage unit 57 is itself connected to the compressed air supply 58 via the pressure regulator 91. It is however of course also conceivable for the compressed air line 56 to be directly connected to the compressed air supply 58 (i.e. without the interposition of the pressure storage unit 57).

The flexible, elastic tube of the powder inlet valve 7 and/or powder outlet valve 8 designed as pinch valves preferably has such an elasticity or inherent tension that it automatically expands again after the pressure of the actuating compressed air in the pressure chamber ceases, with the respective valve channel thereby opening. In order to support the opening of the pinch valve and thus increase the switching frequency able to be realized with the dense phase powder pump 1, it is alternatively or additionally conceivable for a negative pressure to be selectively applied in the pressure chambers via the corresponding air exchange vents 16.

In order for the single-chamber dense phase powder pump of the powder conveyor 100 depicted schematically in FIG. 1 to achieve a homogeneous flow of powder downstream of the powder outlet 3 without disruptive pulsing, the previously cited auxiliary compressed air inlet device 9 is employed, provided at the outlet of the powder outlet valve 8 or the powder outlet 3 of the dense phase powder pump 1 in the depicted example embodiment, so as to be able to feed auxiliary conveying compressed air into the powder path at that point as needed.

In the example embodiment of the inventive powder conveyor 100 depicted in FIG. 1, the auxiliary compressed air inlet device 9 employed comprises a filter tube 17 having a circumference of at least 180° (in the depicted embodiment, the circumference is 360°) and forming a channel inner wall surface over at least 180° (in the embodiment depicted in FIG. 1, the channel wall inner surface covers) 360° of the circumference of the powder path over at least one section of the length of the respective powder path.

In other words, in the embodiment of the inventive powder conveyor 100 depicted schematically in FIG. 1, the auxiliary compressed air inlet device 9 has a filter tube 17 surrounding the corresponding powder path by 360° over at least part of its length so that the portion of powder expelled from the powder conveyor chamber 4 of the dense phase powder pump 1 during a powder discharge phase can flow homogeneously through the filter tube channel 18 formed by the filter tube 17.

A compressed air chamber designed as an annular compressed air chamber in the embodiment depicted schematically in FIG. 1 surrounds the outer circumference of the filter tube 17. The radially inner circumference of the compressed air chamber designed here as an annular compressed air chamber is surrounded by the filter tube 17 and its radially outer circumference by a housing at a distance from the filter tube 17. An air exchange vent 21 is provided in the housing via which compressed air can flow as needed from a compressed air line 59 into the compressed air chamber by way of a control valve V5 (here: solenoid valve) and from there through the filter tube 17 into the filter tube channel 18.

Depending on the volume of the auxiliary conveying compressed air to be fed into the powder path per unit of time, the compressed air chamber and the filter tube channel 18 formed by the filter tube 17 are to be of correspondingly large-volume configuration.

As indicated above, the filter tube 17 of the auxiliary compressed air inlet device 9 is made of a microporous material so as to be permeable to air but not to coating powder. The filter tube 17 preferably consists of a sintered body, for example of metal or plastic, or of a material mixture containing metal or plastic. It can further consist of one material and/or be formed by a filter membrane.

The relatively large inner circumferential surface of the filter tube 17 enables powder to axially distribute in the powder tube channel 18 even at a low volume of compressed air and thus also be homogenized in the powder path downstream of the powder outlet 3 of the dense phase powder pump 1. This can prevent or at least reduce pulses in the powder flow along the powder path. Homogenization of the powder density in the longitudinal direction and over the cross section of the powder path can furthermore be achieved.

According to the embodiment of the inventive powder conveyor 100 schematically depicted in FIG. 1, the auxiliary compressed air is supplied to the auxiliary compressed air inlet device 9 in pulses having a pulse frequency at least as high as the frequency of the powder conveyor chamber 4 dispensing the portions of powder to the powder conveyor chamber 4. It is hereto provided for the two valves V1 and V5 to be actuated in phase opposition. Doing so thus ensures that the volume of conveying compressed air introduced into the powder path per unit of time in the powder-conveying operating mode of the dense phase powder pump 1 is constant over time. In other words, always the same amount of conveying compressed air is fed into the powder path at any one time during the powder-conveying operating mode.

As indicated above, the powder inlet valve 7 and the powder outlet valve 8 of the dense phase powder pump 1 employed in the powder conveyor 100 according to the invention are both designed as a pinch valve since less coating powder can accumulate in pinch valves than in other types of valves and because powder deposits can be easily cleared by the air flowing through them. Pinch valves are valves able to be controlled by means of compressed air or by means of negative pressure.

The previously noted control unit 90, only schematically suggested in FIG. 1, is used to control the operation of the dense phase powder pump 1. The control unit 90 is designed to appropriately control and coordinate the operation of the individual actuatable components of the powder conveyor 100, particularly control valves V1, V2, V3, V4 and V5.

According to the present invention, the control unit 90 is in particular designed to appropriately control the actuatable components of the powder conveyor 100 for the alternating operation of the dense phase powder pump in a powder-conveying operating mode or a flushing operating mode.

It is in particular provided in the embodiment of the inventive powder conveyor 100 depicted schematically in FIG. 1 for the operator of the powder conveyor 100 to select the initial operating mode of the dense phase powder pump 1, for example by means of the control unit 90. Selectable in particular are the powder-conveying operating mode and the flushing operating mode. Depending on the operating mode of the dense phase powder pump 1 selected, the control unit 90 then controls the individual actuatable components of the powder conveyor 100 correspondingly. These also relate in particular to the actuatable components of the pressure regulator 91 for setting the actuation pressure for the powder inlet and powder outlet valves 7, 8 and the pressure value of the compressed gas to be introduced into the conveyor chamber 4 and/or the volume of compressed gas to be introduced into the conveyor chamber per unit of time.

In the powder-conveying operating mode of the dense phase powder pump 1, a portion of powder is alternatingly suctioned from the powder reservoir 101 into the conveyor chamber 4 of the dense phase powder pump 1 through the open powder inlet valve 7. The powder outlet valve 8 is closed during this suction phase. The portion of powder previously suctioned into the conveyor chamber 4 of the dense phase powder pump 1 is then subsequently dispensed 4 through the open powder outlet valve 8 by conveying compressed gas being introduced into the conveyor chamber. The powder inlet valve 7 is closed during the discharging of powder from the conveyor chamber 4.

In contrast, either the powder inlet valve 7 or the powder outlet valve 8 is open while the other of the two valves 8, 7 is closed when the dense phase powder pump 1 is being operated in its flushing mode of operation and while flushing compressed gas, particularly flushing compressed air, is simultaneously or immediately thereafter introduced into the conveyor chamber 4 of the dense phase powder pump 1.

In the opened state of the powder inlet valve 7, the flushing compressed air introduced into the conveyor chamber 4 flows in particular through (flushes) the conveyor chamber 4 of the dense phase powder pump 1, the powder path between the powder inlet 5 and powder inlet 7, the valve channel of the powder inlet valve 7 designed as a pinch valve 7, the powder channel between powder inlet valve 7 and powder inlet 2 of the dense phase powder pump 1 as well as a powder line 103 connected as needed to the powder inlet 2, resulting in the cleansing of the conveyor chamber 4 of the dense phase powder pump 1 and its intake-side region.

When, however, the powder outlet valve 8 is open and the powder inlet valve 7 closed in the flushing operating mode of the dense phase powder pump 1, the flushing compressed gas introduced into the conveyor chamber 4 flushes in particular the powder chamber 4 of the dense phase powder pump 1, the powder path between the powder outlet 6 of the powder conveyor chamber 4 and the powder outlet valve 8, the valve channel of the powder outlet valve 8 designed as a pinch valve, the powder path between the powder outlet valve 8 and the powder outlet 3 of the dense phase powder pump 1 as well as a powder line 104 connected as needed to the powder outlet 3 of the dense phase powder pump 1 such that the conveyor chamber of the dense phase powder pump 1 and its discharge-side region are cleansed.

The cleansing action of the flushing operating mode is at its most efficient when compressed air having a relatively high pressure (for example up to 6 bar) is used as the flushing compressed gas. On the other hand, in the conveying operation of the dense phase powder pump 1; i.e. in powder-conveying mode, introducing conveying compressed gas of relatively low pressure (for example 1 to 3 bar) into the conveyor chamber 4 of the dense phase powder pump 1 normally suffices.

So that the intake-side of the dense phase powder pump 1 or the discharge-side of the dense phase powder pump 1 respectively can be efficiently cleaned during the flushing mode of operation, it is to be ensured that the flushing compressed gas introduced into the conveyor chamber 4 of the dense phase powder pump 1 flows through the respective intake-side region or discharge-side region of the dense phase powder pump 1 without loss. In other words, an efficient cleaning of the conveyor chamber 4 together with the intake-side region of the dense phase powder pump 1 or an efficient cleaning of the conveyor chamber 4 of the dense phase powder pump 1 together with the discharge-side region is then achieved when the powder outlet valve 8 and/or powder inlet valve 7 is sealed in gas-tight manner.

According to the invention, in order to ensure and in particular prevent the flushing compressed gas under high pressure introduced into the conveyor chamber 4 from being able to leak through the closed powder inlet valve 7 and/or powder outlet valve 8, a higher pressure value for the actuation pressure for closing the powder inlet valve 7 and/or powder outlet valve 8 is selected in the flushing operating mode of the dense phase powder pump 1 than the pressure value of the actuation pressure for the powder inlet and powder outlet valve 7, 8 in the powder-conveying operating mode of the dense phase powder pump 1.

To this end, the previously noted pressure control or pressure regulator 91 respectively is provided in the inventive powder conveyor 100, same comprising a control valve V7, particularly a solenoid valve, whereby the control valve V7 is fluidly coupled between the compressed air supply 58 and the pressure storage unit 57. The pressure regulator 91 further comprises a pressure sensor S1 with which the pressure level of the actuating compressed air temporarily stored in the pressure storage unit 57 for the pinch valves 7, 8 can be measured continuously or at predefined times and/or events. In the powder-conveying operating mode of the dense phase powder pump 1, the pressure value of the actuating compressed air temporarily stored in the pressure storage unit 57 is set by means of valve V7 so as to be at a first pressure level of for example 1 to 3 bar. This actuation pressure suffices to be able to seal the respective powder inlet valve 7 designed as a pinch valve or powder outlet valve 8 designed as a pinch valve so as to be gas-tight during the powder-conveying mode of operation.

In the flushing operating mode of the dense phase powder pump 1, however, the pressure of the actuation pressure temporarily stored in the pressure storage unit 57 is to be increased accordingly since—as noted above—the powder inlet valve 7 and/or powder outlet valve 8 needs to be sealed in gas-tight manner against higher pressures during the flushing operating mode of the dense phase powder pump 1. As a result, valve V7 keeps the pressure storage unit 57 fluidly connected to the compressed air supply 58 in the flushing operating mode until the pressure sensor S1 detects that the pressure value of the actuating compressed air temporarily stored in the pressure storage unit 57 for the pinch valves 7, 8 is at a respective higher (second) pressure, for example in a range between 2 to 6 bar.

As previously stated, it is however of course also conceivable for the respective powder inlet and powder outlet valves 7, 8 designed as pinch valves to be directly connectable to the compressed air supply 58 by means of valve V7, i.e. without the interposition of the pressure storage unit 57. In this case, valve V7 would need to assume the pressure control. This can be realized for example by valve V7 being designed as a pressure regulator valve.

The control unit 90 not only adapts the pressure value of the actuating compressed air for the valves 7, 8 designed as pinch valves by means of the pressure regulator 91 as a function of the operating mode of the dense phase powder pump 1, but also the pressure value of the compressed gas to be introduced into the conveyor chamber 4 of the dense phase powder pump 1 (either conveying compressed gas/conveying compressed air or flushing compressed gas/flushing compressed air).

Specifically hereto, the control unit 90 comprises a pressure control, for example as part of pressure regulator 91, for the compressed gas to be introduced into the conveyor chamber 4 of the dense phase powder pump 1. This pressure control is realized in the embodiment of the inventive powder conveyor 100 schematically depicted in FIG. 1 by the air exchange vent 13, which is provided in the housing of the powder conveyor chamber 4, being fluidly connected or connectable to the compressed air supply 58 via the air supply line 50 and a butterfly valve V8 serving as a throttle device and a solenoid valve V9. Depending on the mode of operation selected for the dense phase powder pump 1 (powder-conveying operating mode or flushing operating mode), the butterfly valve V8 is used to reduce the actuation pressure provided by the compressed air supply 58 from e.g. 6 bar to another pressure level as needed in the respective operating mode of the dense phase powder pump 1.

The pressure regulator 91 is preferably designed to set the pressure value of the actuation pressure to be applied on the powder inlet valve 7 and/or powder outlet valve 8 to a range of from 1 to 3 bar in the powder-conveying operating mode and the pressure value of the actuation pressure to be applied on the powder inlet valve 7 and/or powder outlet valve 8 in the flushing operating mode to a range of from 2 to 5 bar. This is effected particularly by means of valve V7.

Figure 2:
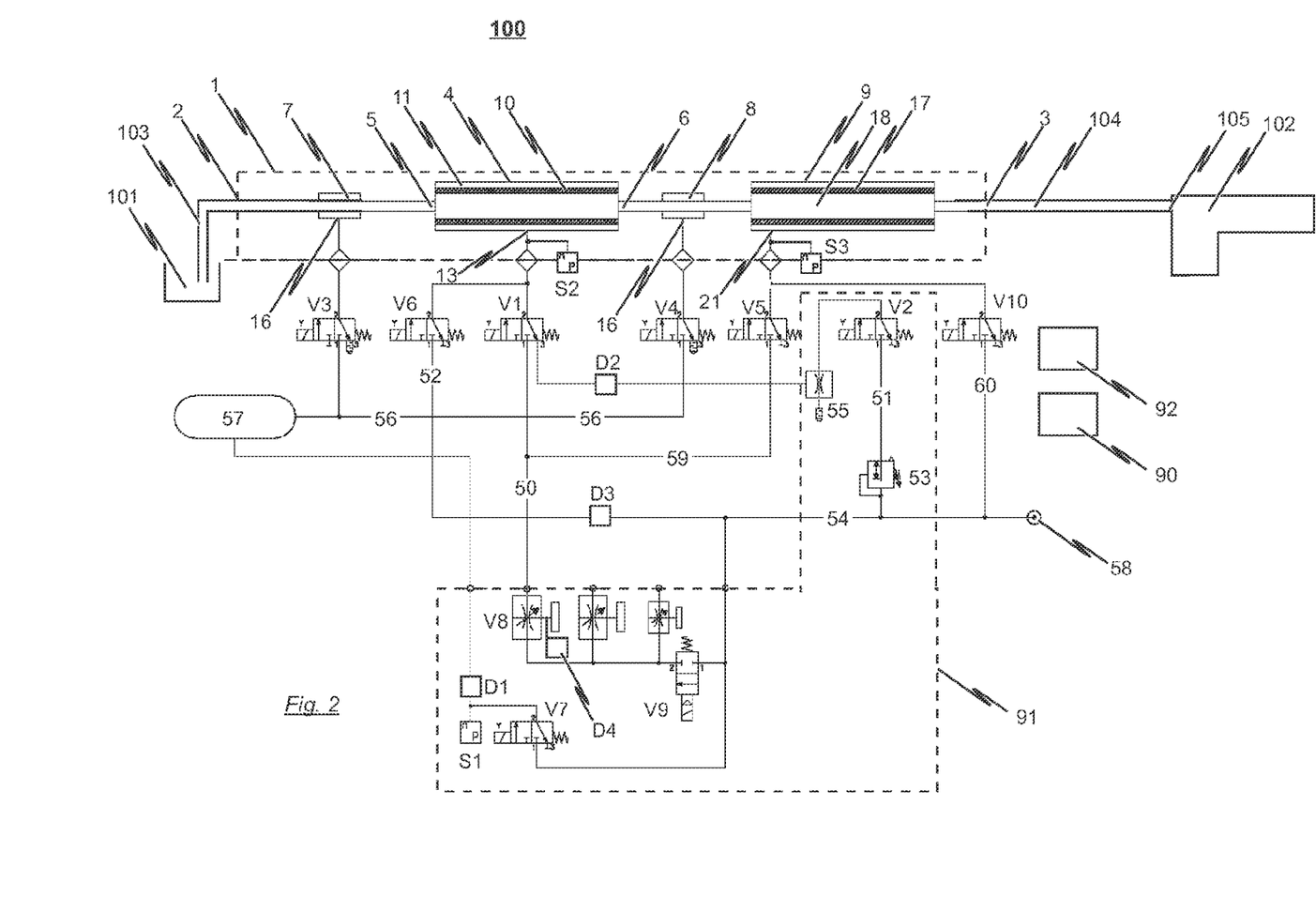
FIG. 2 a schematic depiction of a further example embodiment of a powder conveyor according to the present invention.

The example embodiment of the inventive powder conveyor 100 depicted schematically in FIG. 2 substantially corresponds to the embodiment described above with reference to FIG. 1, whereby a first bypass compressed air line 52 is however provided here which is connected on one side to the compressed air supply, compressed air supply 58 respectively (via air supply line 54), and connectable on the other side to the air exchange vent 13 of the dense phase powder pump 1 by way of another valve V6 (here: solenoid valve).

In the embodiment depicted in FIG. 2, the bypass compressed air line 52 serves to fluidly connect the air exchange vent 13 of the dense phase powder pump 1 directly to the compressed air supply 58 in the flushing operating mode of the dense phase powder pump 1 in order for the compressed air provided by the compressed air supply 58 to be directly introduced into the conveyor chamber 4 of the dense phase powder pump 1.

A further bypass compressed air line 60 is additionally provided which is connected on one side to the compressed air supply, compressed air supply 58 respectively, and connectable on the other side to the air exchange vent 21 of the auxiliary compressed air inlet device 9 by way of a further valve V10 (here: solenoid valve). In the embodiment depicted in FIG. 2, the further bypass compressed air line 60 serves to fluidly connect the air exchange vent 21 of the auxiliary compressed air inlet device 9 directly to the compressed air supply 58 in the flushing operating mode of the dense phase powder pump 1 in order for the compressed air provided by the compressed air supply 58 to be directly introduced into the auxiliary compressed air inlet device 9.

In the alternative embodiment depicted schematically in FIG. 2, the actuation pressure of the compressed air provided by the compressed air supply 58 is only reduced by way of the butterfly valve V8 during the powder-conveying operating mode of the dense phase powder pump 1.

As indicated above, the butterfly valve V8 is employed in the solution according to the invention as the throttle mechanism of the pressure regulator 91. The butterfly valve V8 is preferably designed to locally set a flow cross section of the compressed gas line 50 fluidly connected or connectable to the conveyor chamber 4 of the dense phase powder pump 1 as needed so as to thereby vary or adapt the volume of compressed gas fed per unit of time to the conveyor chamber 4 and/or the pressure value of the actuation pressure to be applied on the air exchange vent 13 to the respective operating mode of the dense phase powder pump 1.

According to one preferential realization of the throttle device used in the inventive powder conveyor 100, the butterfly valve V8 is designed as a form of control valve, wherein the butterfly valve V8 serves to adjust the pressure of the conveying compressed gas to be introduced into the conveyor chamber 4 during the powder-conveying operating mode and/or to set an amount of conveying compressed gas to be introduced into the conveyor chamber 4 per unit of time during the powder-conveying operating mode. It is hereby of advantage for the at least one butterfly valve V8 to be further designed to adjust the pressure of the flushing compressed gas to be introduced into the conveyor chamber 4 during the flushing operating mode and/or to set an amount of flushing compressed gas to be introduced into the conveyor chamber 4 per unit of time during the flushing operating mode.

In conjunction hereto, it is conceivable for the butterfly valve V8 to comprise a stationary valve, a valve seat in particular, and a valve part, a valve needle in particular, which is movable relative thereto, and thereby adjustable, for changing the opening width of a throttling channel of the butterfly valve V8, whereby the geometrical form of the adjustable valve part (valve needle) is selected such that the butterfly valve V8 exhibits a flow characteristic having at least two substantially linear regions. The at least substantially linear regions of the flow characteristic thereby exhibit different gradients.

According to the present invention, the control unit 90 is preferably designed to control the butterfly valve V8 such that the compressed gas flow through the butterfly valve V8 is within the first substantially linear region of the flow characteristic in the powder-conveying operating mode of the dense phase powder pump 1, wherein the control unit 90 controls the butterfly valve V8 in the flushing operating mode of the dense phase powder pump 1 such that the compressed gas flow through the butterfly valve V8 is within the second substantially linear region of the flow characteristic. By so doing, it is possible for one single valve (butterfly valve V8) to realize two different pressure levels for the compressed gas to be introduced into the conveyor chamber 4 of the dense phase powder pump 1 such that one can dispense with the valve V6 configured for example as a solenoid valve as employed in the FIG. 2 pneumatic diagram.

Preferably, the butterfly valve V8 is controllable by means of an actuator actuatable by the control unit 90, particularly an electric actuator, in order to adjust the flow of compressed gas through the butterfly valve V8 by a moving of the movable valve part relative to the stationary valve part (valve seat).

In summary, it can be stated that the pressure regulator 91 employed in the powder conveyors 100 schematically depicted in FIGS. 1 and 2 serves in the adjusting and maintaining of a predefined or definable set pressure on the at least one conveyor chamber 4 of the dense phase powder pump 1 and in the adjusting and maintaining of a predefined or definable actuation pressure on the powder inlet valve 7 and/or powder outlet valve 8.

To that end, a sensor device having a first pressure sensor S1 and a second pressure sensor S2 is provided in the example embodiment of the inventive solution depicted in the drawings. The first pressure sensor S1 is allocated to the powder inlet and powder outlet valves 7, 8 designed as pinch valves and serves to detect the existing pressure on the powder inlet valve 7 upon the actuating of the powder inlet valve 7 or, respectively, the existing pressure on the powder outlet valve 8 upon the actuating of the powder outlet valve 8. The second pressure sensor S2 detects the existing negative pressure in the at least one conveyor chamber 4 during a powder suction phase of the dense phase powder pump 1 as well as the existing excess pressure in the at least one conveyor chamber 4 during a powder discharge phase or a flushing operating mode of the dense phase powder pump 1.

In detail, the first pressure sensor S1 is arranged at the outlet of the pressure regulator 91 and fluidly connected or connectable to the powder inlet valve 7 and the powder outlet valve 8 in the embodiments of the inventive powder conveyor 100 depicted as examples in the drawings.

The second pressure sensor S2 is arranged directly on the conveyor chamber 4 of the dense phase powder pump 1 in the example embodiments and serves to detect a set pressure value for an excess pressure applied on the conveyor chamber 4 in the intermediate chamber 11 formed between the filter 10 and the conveyor chamber housing 12 during a powder discharge phase of the dense phase powder pump 1 or a flushing operating mode of the dense phase powder pump 1. By arranging the second pressure sensor S2 on the conveyor chamber 4 of the dense phase powder pump 1, the pressure sensor S2 can also detect a pressure value set for the negative pressure applied on the conveyor chamber 4 in the intermediate chamber 11 formed between the filter 10 and the conveyor chamber housing 12 in a powder discharge phase of the dense phase powder pump 1.

That said, however, it is also conceivable for one pressure sensor to be allocated in each case to the powder inlet valve 7 and/or the powder outlet valve 8. Arranging the second pressure sensor S2 in the compressed gas line 50 is further conceivable.

It is moreover in principle also conceivable for a pressure sensor S3 to be allocated to the auxiliary compressed air inlet device 9 in order to detect the existing excess pressure when auxiliary compressed air is introduced into the compressed air chamber of the auxiliary compressed air inlet device 9. To be hereby considered is that one single pressure sensor, arranged for example at the outlet of valve V8, can of course also be provided in place of two different pressure sensors S2 and S3.

The pressure sensors S1, S2 and S3 form a sensor device which is functionally a part of the pressure regulator 91 since when the dense phase powder pump 1 is in operation, the sensor device detects and controls whether the predefined pressure values are actually set for the correspondingly pneumatically actuated components of the dense phase powder pump 1 or whether the pressure regulator needs to intervene in respective regulatory manner. The provision of the sensor device in particular ensures that the respective predefined or definable set values are set at the at least one conveyor chamber 4 of the dense phase powder pump 1 during the powder-conveying mode of operation and flushing mode of operation. For example, a predefined excess pressure of 1 to 3 bar is applied in the conveyor chamber 4 during a powder discharge phase in powder-conveying mode. In the flushing mode of operation, however, the pressure set in the conveyor chamber is to be higher, e.g. 2 to 5 bar.

The first pressure sensor S1 of the sensor device further ensures that upon the actuating of the powder inlet and powder outlet valves 7, 8 configured as pinch valves, a predefined actuation pressure of for example 1 to 6 bar (depending on the operating mode of the dense phase powder pump 1) is set on same.

The pressure sensors S1, S2, S3 of the sensor device cooperate with the pressure regulator 91 such that the pressure values detected by the sensor device are fed to the pressure regulator 91 as actual values in a (not shown) feedback coupling, whereby the pressure regulator 91 adjusts the pressures to be set and maintained for the pneumatically actuatable components of the dense phase powder pump during its operation to the respectively predefined or definable value. As described previously, this ensues in the embodiments schematically depicted in the drawings inter alia by suitably controlling the butterfly valve V8 such that a flow cross section and thus the amount of conveying compressed gas supplied to the conveyor chamber 4 per unit of time is correspondingly varied.

As shown in the drawings, the inlet of the pressure regulator 91 is fluidly coupled to the compressed air source or compressed air source 58 respectively. The compressed air source 58 provides a predefined or definable constant supply pressure and is for example designed as an inlet pressure regulator which adjusts an inlet pressure applied on a supply connection to an internal constant supply pressure.

Accordingly, at least in the example embodiment according to FIG. 1, the pressure regulator 91 is designed to i) set a predefined or definable pressure value for a conveying compressed gas to be supplied to the conveyor chamber 4 during a powder discharge phase, ii) set a predefined or definable pressure value for a flushing compressed gas to be supplied to the conveyor chamber 4 in the flushing operating mode of the dense phase powder pump 1, and iii) set a predefined or definable pressure value for an actuation pressure to be applied to the powder inlet valve 7 and/or the powder outlet valve 8 to actuate the respective valve.

It is to be noted in conjunction hereto that the pressure regulator 91 is also designed to set a predefined or definable pressure value of a negative pressure to be applied to the conveyor chamber 4 during a powder discharge phase. To this end, the pressure regulator 53 of the vacuum source and/or the control valve V2 are preferably actuated by means of the control device 90.

In the example embodiments according to FIGS. 1 and 2, it is not only ensured that a predefined negative pressure is set in the conveyor chamber 4 of the dense phase powder pump 1 in a powder discharge phase during the powder-conveying operating mode of the dense phase powder pump 1, but also that the volume of conveying compressed gas supplied to the conveyor chamber 4 per unit of time is detected or determined respectively. Similarly, the pressure regulator 91 ensures that a predefined negative pressure is set in the conveyor chamber 4 of the dense phase powder pump 1 in the flushing operation mode of the dense phase powder pump 1; the volume of flushing gas supplied to the conveyor chamber 4 per unit of time is moreover detected and/or determined.

A gas flow detection device is provided for this purpose. The gas flow detection device is designed to detect or determine respectively the value of the volume of gas fed to or discharged from the conveyor chamber 4 per unit of time when adjusting and maintaining a specific predefined pressure (excess or negative pressure) and/or the value of the volume of gas fed to the powder inlet valve 7/powder outlet valve 8 per unit of time when adjusting and maintaining the actuation pressure.

In the example embodiments shown in the drawings, the volumetric gas flow is determined in different ways: firstly, flow rate sensors D1, D2, D3 can be used. Thus, in the embodiments of the inventive powder conveyor 100 depicted in FIGS. 1 and 2, flow rate sensor D1 serves for example to detect or determine the value of the volume of gas to be supplied per unit of time when adjusting and maintaining the actuation pressure on powder inlet valve 7 and/or powder outlet valve 8 while flow rate sensor D2 is provided to detect or determine the amount of gas to be suctioned from the conveyor chamber 4 per unit of time during a powder suction phase of the dense phase powder pump 1.

A flow rate sensor D3 is moreover provided in the bypass line 52 in the embodiment depicted in FIG. 2 in order to detect the amount of flushing compressed gas supplied to the conveyor chamber 4 per unit of time in the flushing operating mode of the dense phase powder pump 1.

The amount of conveying compressed gas fed to the conveyor chamber 4 per unit of time during a powder discharge phase is determined in the embodiments according to FIGS. 1 and 2 based on a flow cross section of the throttle mechanism (butterfly valve V8) set by the pressure regulator. An actuating variable sensor D4 is provided thereto, with which the actuating variable of the throttle mechanism (butterfly valve V8) is detected. The actuating variable as determined enables identifying a corresponding valve characteristic of the gas flow. Alternatively, however, it is also conceivable for no quantitative value of the gas flow to be determined. For example, the detected actuating variable of the throttle mechanism can be used directly as a qualitative value of the gas flow.

In the embodiment depicted in FIG. 1, the amount of flushing compressed gas supplied to the conveyor chamber 4 per unit of time in the flushing operating mode is also detected or determined indirectly by way of the actuating variable sensor D4; i.e. on the basis of a flow cross section of the throttle mechanism (butterfly valve V8) set by the pressure regulator.

An evaluation device 92, depicted only schematically in FIGS. 1 and 2, serves in the powder conveyor 100 according to the invention to evaluate the gas flows detected or determined by the gas flow detection device. In detail, the evaluation device 92 is designed to compare at least one gas flow value detected or determined by the gas flow detection device to a respective set value, wherein the evaluation device 92 is further designed to automatically issue an error or warning signal when the at least one detected gas flow value deviates from the respective set value, preferably as a function of the magnitude of the deviation.

It is particularly preferential for the evaluation device 92 to be designed to automatically deduce a leak in the powder inlet valve 7 or powder outlet valve 8 or a malfunction of the powder inlet valve 7 or powder outlet valve 8 and issue a corresponding error and/or warning signal when the gas flow detection device detects that the volume of actuating compressed gas supplied per unit of time to the powder inlet/outlet valve 7, 8 as required for establishing and maintaining the predefined or definable actuation pressure on the powder inlet/outlet valve 7, 8 is higher than a predefined or definable volumetric gas flow plus any given tolerance there might be.

Alternatively or additionally thereto, the evaluation device 92 is designed to automatically deduce blockage, aging or malfunctioning of the filter 10 allocated to the conveyor chamber 4 and issue a corresponding error and/or warning signal when it is detected by the gas flow detection device or in another way that the amount of compressed gas supplied to the conveyor chamber 4 per unit of time in at least one powder discharge phase or in the flushing mode of the dense phase powder pump 1 as required to set and maintain the predefined or definable set pressure in the conveyor chamber 4 deviates from a predefined or definable gas flow plus any applicable tolerance.

The evaluation device 92 of the embodiments depicted in FIG. 1 and FIG. 2 is furthermore designed to automatically deduce a blockage of the filter 10 allocated to the conveyor chamber 4 and issue a corresponding error and/or warning signal when the gas flow detection device (flow rate sensor D2) detects that the amount of compressed gas discharged from the conveyor chamber 4 per unit of time as is required to set and maintain the predefined or definable negative pressure in the conveyor chamber 4 in at least one powder suction phase of the dense phase powder pump 1 deviates from a predefined or definable gas flow plus any applicable tolerance there might be.

As stated above, in the embodiments of the inventive powder conveyor 100 depicted schematically in FIGS. 1 and 2, the auxiliary compressed air is supplied to the auxiliary compressed air inlet device 9 in pulses at a pulse frequency as high as the frequency of the powder conveyor chamber 4 at which the portions of powder are dispensed to the powder conveyor chamber 4. It is hereto provided for the two valves V1 and V5 to be actuated in phase opposition.

It is accordingly of advantage for the volume of conveying compressed gas fed to the conveyor chamber 4 per unit of time and/or the volume of auxiliary compressed air fed to the auxiliary compressed air inlet device 9 per unit of time in the powder-conveying operating mode to be compared to a set value in order to be able to reach a conclusion as to the state of the respective filter element 10, 17.

On the other hand, however, it is also conceivable to compare the volume of conveying compressed gas supplied to the conveyor chamber 4 per unit of time in the powder-conveying operating mode to the volume of auxiliary compressed air supplied to the auxiliary compressed air inlet device 9 per unit of time in order to reach a conclusion about the state of the respective filter element 10, 17. Provided that the filter element 10 allocated to the conveyor chamber 4 as well as the filter element 17 allocated to the auxiliary compressed air inlet device 9 have the same pressure resistance (which can for example be realized by both filter elements being of structurally identical design), the volume of conveying compressed gas fed to the conveyor chamber 4 per unit of time has to be identical to the volume of auxiliary compressed air fed to the auxiliary compressed air inlet device 9 per unit of time. A difference between the two is an indication that one of the two filter elements 10, 17 is clogged. When it is for example detected that the volume of conveying compressed gas supplied to the conveyor chamber 4 per unit of time is less than the volume of auxiliary compressed air supplied to the auxiliary compressed air inlet device 9 per unit of time, it can be concluded that filter element 10 is (at least partially) clogged.

Figure 3:
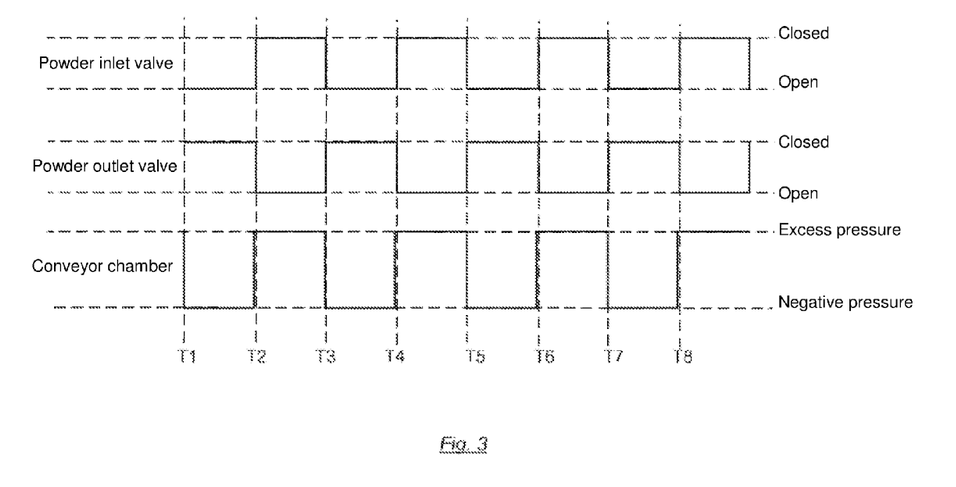
FIG. 3 an example timing control program of the dense phase powder pump in the powder-conveying mode of operation.

FIG. 3 shows an example pneumatic operation diagram for the operation of the dense phase powder pump 1 in the powder-conveying mode. At time T1, the solenoid valve V3 allocated to the powder inlet valve 7 is closed so that no actuating compressed air is supplied to the powder inlet valve 7 and it is in its open state.

In contrast, the solenoid valve V4 allocated to powder outlet valve 8 is open at time T1 and actuating compressed gas, particularly actuating compressed air, is thus supplied to the powder outlet valve 8 by way of the pressure storage unit 57 or pressure regulator 91 so that it is in its closed state.

Likewise at time T1, the solenoid valve V1 allocated to the conveyor chamber 4 of the dense phase powder pump 1 is actuated such that the air exchange vent 13 of the conveyor chamber 4 is fluidly coupled to the vacuum source 52. The conveyor chamber 4 is thereby subjected to negative pressure so that a portion of powder can be suctioned out of the first powder reservoir 101 and the open powder inlet valve 7 into the conveyor chamber 4.

A change from the powder suction phase to the powder discharge phase occurs at time T2. To this end, the solenoid valve V3 allocated to powder inlet valve 7 is opened in order to fluidly couple the air exchange vent 16 of the powder inlet valve 7 to the compressed air line 56 and subject the intermediate chamber of the powder inlet valve 7 to an actuation pressure, the powder inlet valve 7 hence being closed.

In contrast, the solenoid valve V4 allocated to powder outlet valve 8 is closed at time T2 so that no further actuating compressed air can flow via the air exchange vent 16 of powder outlet valve 8 into the intermediate chamber of powder outlet valve 8. The venting of the intermediate chamber results in the pressure in the intermediate chamber taking on the atmospheric pressure and the powder outlet valve 8 changing over to its open state.

The expelling of a portion of powder previously suctioned into the conveyor chamber 4 is effected by the solenoid valve V1 allocated to the conveyor chamber 4 being actuated at time T2 such that the air exchange vent 13 of the conveyor chamber 4 is fluidly coupled to the compressed air line 50. In consequence thereof, conveying compressed air is fed to the conveyor chamber 4.

The dense phase powder pump 1 changes back over into the powder suction phase at time T3.

The invention is not limited to the example embodiments depicted in the drawings but rather yields from a synopsis of all the features disclosed herein together.

It is particularly conceivable in the embodiments depicted in FIGS. 1 and 2 for not only a gas flow as supplied to the conveyor chamber 4 to be detected or determined but also for a gas flow supplied to the auxiliary compressed air inlet device 9 during the operation of the dense phase powder pump 1 to be determined. If a comparison performed by the evaluation device 92 between the detected actual value of the gas flow as supplied to the auxiliary compressed air inlet device 9 and a respectively defined set value shows that the actual value deviates from the set value, a blockage of the filter tube 17 of the auxiliary compressed air inlet device 9 can be concluded.

The invention claimed is:

1. A powder conveyor for coating powder, wherein the powder conveyor comprises the following:
   a pneumatically actuatable dense phase powder pump comprising at least one conveyor chamber having a powder inlet valve and a powder outlet valve, wherein the powder inlet valve and powder outlet valve are respectively designed as pneumatically actuatable pinch valves which close upon application of an actuation pressure;
   a pressure regulator for adjusting and maintaining a predefined or definable set pressure on the at least one conveyor chamber of the dense phase powder pump and/or for adjusting and maintaining a predefined or definable actuation pressure on the powder inlet valve and/or powder outlet valve;
   a gas flow detection device for detecting or determining the volume of gas fed to or discharged from the at least one conveyor chamber per unit of time when adjusting and maintaining the predefined or definable set pressure and/or for detecting or determining the volume of gas fed to the powder inlet valve and/or powder outlet valve per unit of time when adjusting and maintaining a predefined or definable actuation pressure; and
   an evaluation device designed to compare at least one detected or determined volumetric gas flow vary flow value to a corresponding set value, wherein the evaluation device is further designed to automatically issue an error and/or warning signal upon the at least one detected volumetric gas flow value deviating from the respective set value, preferably as a function of the magnitude of the deviation;
   wherein the pressure regulator comprises an inlet and at least one outlet, wherein the inlet of the pressure regulator is fluidly connected or connectable to a compressed air source providing a predefined or definable constant supply pressure, and wherein the pressure regulator comprises at least one throttle device for localized adjusting of a discharge cross section so as to provide the set pressure to be applied on the at least one conveyor chamber and/or the actuation pressure to be applied on the powder inlet valve or powder outlet valve at the at least one outlet of the pressure regulator; and
   wherein the gas flow detection device is designed to detect the value of the volume of gas fed to or discharged from the at least one conveyor chamber per unit of time when adjusting and maintaining the set pressure and/or the value of the volume of gas supplied to the powder inlet valve or powder outlet valve per unit of time when adjusting and maintaining the actuation pressure based on a flow cross section of the at least one throttle device set by the pressure regulator.

2. The powder conveyor according to claim 1, wherein a sensor device is provided to detect at least one set pressure value at the powder inlet valve upon the actuation of said powder inlet valve and/or to detect at least one set pressure value at the powder outlet valve upon the actuation of said powder outlet valve and/or to detect at least one set negative pressure value in the at least one conveyor chamber during a powder suction phase of the dense phase powder pump and/or to detect at least one set negative pressure value in the a least one conveyor chamber during a powder discharge phase or flushing mode of the dense phase powder pump.

3. The powder conveyor according to claim 2, wherein the pressure regulator is designed to adjust the flow cross section of the at least one throttle device as a function of at least one pressure valve detected by the sensor device such that the at least one pressure valve detected by the sensor device, corresponds to the at least one set valve to be applied to the conveyor chamber or the actuation pressure to the applied to the powder inlet/outlet valve.

4. The powder conveyor according to claim 1, wherein the pressure regulator is designed to provide a negative pressure during a powder suction phase of the dense phase powder pump and/or provide an excess pressure during a powder discharge phase of the dense phase powder pump and/or to provide an actuation pressure for the actuation of the powder inlet valve and/or provide an actuation pressure for the actuation of the powder outlet valve.

5. The powder conveyor according to claim 1, wherein the gas flow detection device is designed to at least intermittently detect one of the following chronological sequences during the operation of the dense phase powder pump and compare same to a correspondingly predefined chronological sequence:
   the chronological sequence of an amount of actuating compressed gas fed to the powder inlet valve per unit of time upon the powder inlet valve being actuated;
   the chronological sequence of an amount of actuating compressed gas fed to the powder outlet valve per unit of time upon the powder outlet valve being actuated;
   the chronological sequence of an amount of gas discharged from the at least one conveyor chamber per unit of time during powder suction phases of the dense phase powder pump and
   the chronological sequence of an amount of compressed conveying gas fed to the at least one conveyor chamber per unit of time during powder discharge phases of the dense phase powder pump.

6. The powder conveyor according to claim 5, wherein the evaluation device is designed to automatically issue an error and/or warning signal upon detecting that at least one chronological process deviates from the respectively predefined chronological process, preferably as a function of the magnitude and/or chronological gradient to the difference between the predefined chronological process and the detected chronological process.

7. The powder conveyor according to claim 1, wherein the powder inlet valve and/or the powder outlet valve is/are designed as a pinch valve, and of the type in which a flexible tube separates a valve channel in the tube interior from a pressure chamber allocated to the pinch valve on the tube exterior, wherein the actuation pressure of the actuating compressed gas introduced into the pressure chamber can squeeze the tube and thereby close the valve channel.

8. The powder conveyor according to claim 1, wherein the evaluation device is designed to automatically deduce a leak in the powder inlet valve or powder outlet valve or a malfunction of the powder inlet valve or powder outlet valve and issue a corresponding error and/or warning signal when it is detected by the gas flow detection device that the amount of actuating compressed gas supplied per unit of time to the powder inlet/outlet valve as required for applying the predefined or definable actuation pressure on the powder inlet/outlet valve is higher than a predefined or definable gas flow volume plus any applicable tolerance.

9. The powder conveyor according to claim 1, wherein the conveyor chamber has a chamber wall formed by a filter along at least a part of the length between a powder inlet and a powder outlet of the conveyor chamber, wherein the filter surrounds the conveyor chamber and separates the conveyor chamber from a partition wall surrounding the filter and formed between the filter and a conveyor chamber housing, wherein the filter is permeable to gas but not to coating powder.

10. The powder conveyor according to claim 2, wherein the sensor device comprises at least one pressure sensor allocated to the conveyor chamber to detect an actually set pressure value of an excess pressure applied on the conveyor chamber in the intermediate chamber formed between the filter and the conveyor chamber housing during a powder discharge phase of the dense phase powder pump or a flushing operating mode of the dense phase powder pump.

11. The powder conveyor according to claim 2, wherein the conveyor chamber has a chamber wall formed by a filter along at least a part of the length between a powder inlet and a powder outlet of the conveyor chamber, wherein the filter surrounds the conveyor chamber and separates the conveyor chamber from a partition wall surrounding the filter and formed between the filter and a conveyor chamber housing, wherein the filter is permeable to gas but not to coating powder; and
wherein the sensor device comprises at least one pressure sensor allocated to the conveyor chamber to detect an actually set pressure value of a negative pressure applied on the conveyor chamber in the intermediate chamber formed between the filter and the conveyor chamber housing during a powder discharge phase of the dense phase powder pump.

12. The powder conveyor according to claim 1, wherein the evaluation device is designed to automatically deduce blockage, aging or malfunctioning of a filter element or filter allocated to the conveyor chamber and issue a corresponding error and/or warning signal when the gas flow detection device detects that the amount of compressed gas supplied to the conveyor chamber per unit of time in at least one powder discharge phase or in the flushing mode of the dense phase powder pump as required to set and maintain the predefined or definable set pressure in the conveyor chamber deviates from a predefined or definable gas flow volume plus any applicable tolerance.

13. The powder conveyor according to claim 1, wherein the evaluation device is designed to automatically deduce the clogging of a filter element or filter allocated to the conveyor chamber and issue an appropriate error and/or warning signal when during at least one powder discharge phase of the dense phase powder pump, the gas flow detection device detects that the amount of compressed gas supplied to the conveyor chamber per unit of time as required to set and maintain a predefined or definable negative pressure in the conveyor chamber deviates from a predefined or definable gas flow volume plus any applicable tolerance.

14. The powder conveyor according to claim 1, wherein a powder suction phase and a powder discharge phase alternate consecutively during a powder-conveying operating mode of the dense phase powder pump, wherein a portion of powder is suctioned into the conveyor chamber through the open powder inlet valve while the powder outlet valve is closed during the powder suction phase, and wherein the portion of powder previously suctioned into the conveyor chamber is expelled in the powder discharge phase through the open powder outlet valve by the introduction of conveying compressed gas into conveyor chamber while the powder inlet valve is closed.

15. The powder conveyor according to claim 1, wherein during the flushing operating mode of the dense phase powder pump, the powder inlet valve and/or powder outlet valve is open to flushing compressed gas is introduced into the conveyor chamber.

16. The powder conveyor according to claim 15, wherein the pressure regulator is designed to set a predefined or definable excess pressure in the at least one conveyor chamber in the flushing operating mode of the dense phase powder pump;
wherein the gas flow detection device is designed to detect the amount of compressed gas to be supplied to the conveying chamber required to set and maintain the predefined or definable excess pressure in the at least one conveying chamber in the flushing operating mode of the dense phase powder pump; and
wherein the evaluation device is designed to compare the volumetric gas flow detected in the flushing operating mode to a predefined set value and automatically issue an error and/or warning signal upon the detected volumetric gas flow valve deviated from the set value, preferably as a function of the magnitude of the deviation.

17. The powder conveyor according to claim 1, wherein the pressure regulator is designed to:
set a predefined or predefinable pressure value of a conveying compressed gas to be supplied to the conveyor chamber during a powder discharge phase; and/or
set a predefined or predefinable pressure value of a negative pressure to be applied in the conveyor chamber during a powder suction phase; and/or
set a predefined or predefinable pressure value of a flushing compressed gas to be supplied to the conveyor chamber during a flushing operating mode of the dense phase powder pump; and/or
set a predefined or predefinable pressure value of an actuation pressure to be applied on the powder inlet value and/or the powder outlet value for the actuation of the respective valve.

18. The powder conveyor according to claim 1, wherein the gas flow detection device is designed to detect a quantitative or qualitative value of the volumetric gas flow supplied to or discharged from the at least one conveyor chamber per unit of time in the adjusting and maintaining of the set pressure and/or a quantitative or qualitative value of the volume of gas supplied to the powder inlet valve or powder outlet valve per unit of time in the adjusting and maintaining of the actuation pressure on the powder inlet valve or powder outlet valve.

19. The powder conveyor according to claim 1, wherein the gas flow detection device comprises a flow sensor device for detecting a volumetric or mass flow rate in a compressed gas line fluidly coupled in an outlet of the pressure regulator to the conveyor chamber and/or to for detecting a volumetric or mass flow rate in a compressed gas line fluidly coupled in an outlet of the pressure regulator to the powder inlet valve or powder outlet valve.

* * * * *